Aug. 8, 1961  M. L. ABEL  2,995,044
TWO-STEP PULLEY
Filed Sept. 12, 1957
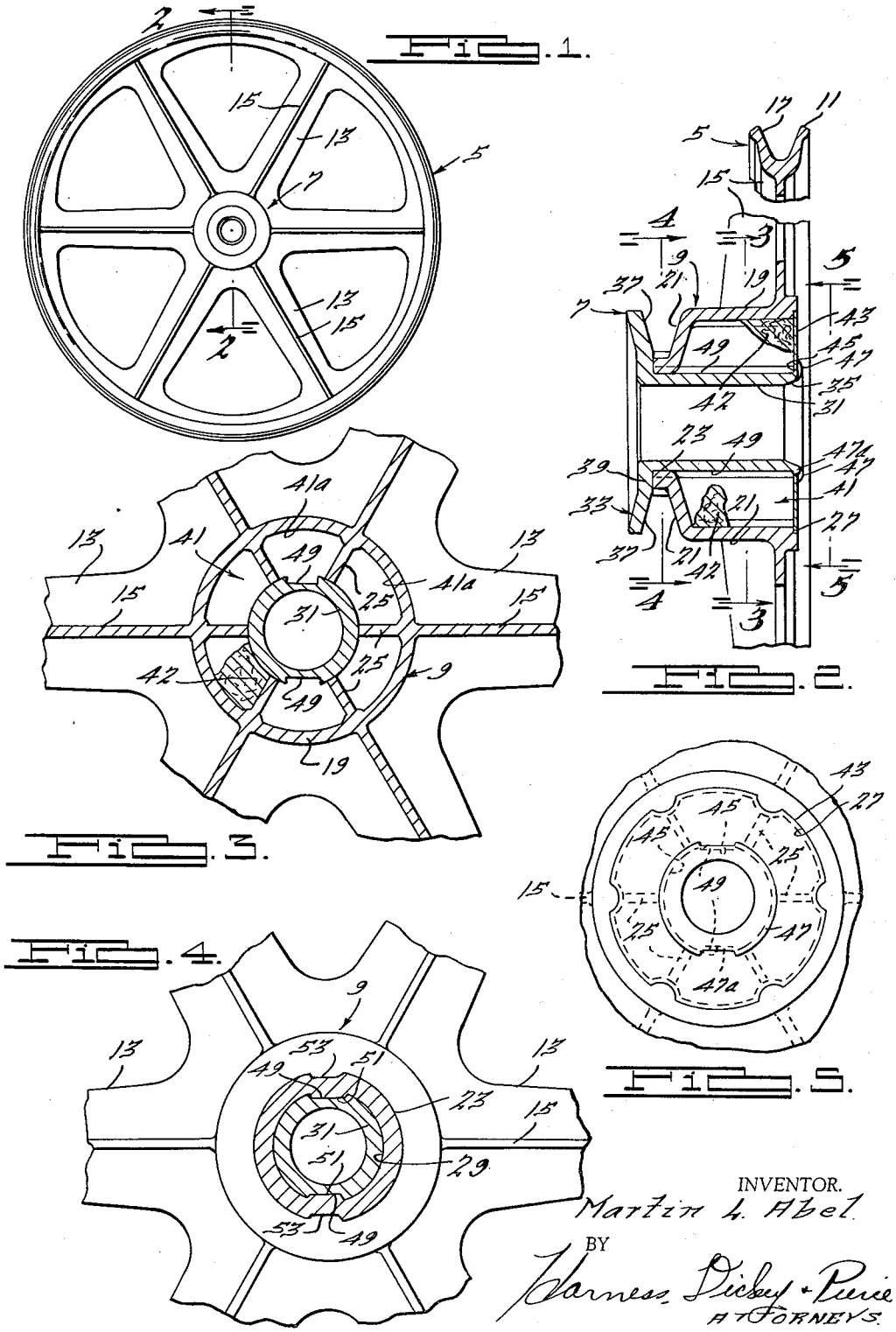
INVENTOR.
Martin L. Abel
BY
Harness, Dickey & Pierce
ATTORNEYS.

United States Patent Office 2,995,044
Patented Aug. 8, 1961

2,995,044
TWO-STEP PULLEY
Martin L. Abel, Detroit, Mich., assignor to Tann Corporation, Detroit, Mich., a corporation of Michigan
Filed Sept. 12, 1957, Ser. No. 683,553
11 Claims. (Cl. 74—230.3)

This invention relates to improvements in construction of composite pulleys, and more particularly of multi-step composite pulleys.

Important objects of the invention are to provide an improved composite pulley construction which effects substantial economies in manufacturing costs and which is rugged and reliable in operation and self-lubricating; to provide a composite pulley which is multi-stepped and comprised of two dissimilar elements fitted together, one of which has a portion extending through and secured to the other; to provide a two-step composite pulley in which at least one of the steps is defined by suitably formed cooperating portions on each element; to provide a two-step composite pulley which has a lubricating reservoir formed therein by the two elements; to provide in combination with a pulley of the character indicated wicking material injected into and carried by the reservoir; to provide a pulley construction of the type specified in which one element is a sintered porous bearing material and the other a casting, whereby lubricant is carried to the pulley shaft through the said one element; and to provide a novel method of manufacturing and assembling composite pulleys.

The above and related objects will become apparent during the course of the following description taken in conjunction with the accompanying drawings.

In the drawings:

FIGURE 1 is a front elevational view of a two-step composite pulley embodying the invention;

FIG. 2 is a fragmentary vertical sectional view of the structure of FIG. 1 on line 2—2 thereof.

FIGS. 3 and 4 are vertical sectional views of the structure of FIG. 2 substantially along the lines 3—3 and 4—4 thereof, respectively, and FIG. 5 is a fragmentary rear elevational view of the structure of FIG. 2 looking in the direction of the arrows and along the line 5—5 thereof.

Referring to the particular embodiment shown in the drawings, the composite pulley therein is a two-step pulley comprising elements indicated generally at 5 and 7, respectively. The element 5 has a central hub generally designated 9, a rim 11 and an interconnecting web consisting of a plurality of spokes 13. Each spoke 13 includes an integral rib 15 extending between the hub 9 and the rim 11 and which tapers from a maximum at the hub 9 to a minimum at the rim 11. The rim 11 has formed thereon a pulley groove 17 which has the shape in cross-section as shown in FIG. 2 and which constitutes one of the two steps of the composite pulley.

The hub 9 is generally cup-shaped and comprises a substantially cylindrical body 19 connected at one end to the integrally formed spokes 13 and terminating at its other end in a truncated conical portion or flange 21 which forms one wall of the V-groove of the second step of the pulley. At the inner end of this conical portion is a short and generally cylindrical portion 23 forming the base of the V-groove of this second step. Integrally formed with the conical portion 21 and the cylindrical body 19 are a plurality of circumferentially spaced radially inwardly extending ribs 25 which extend axially from the tapered portion 21 substantially to the opposite end of the hub 9. The short cylindrical portion 23 and the inner ends of the plurality of ribs 25 define a central axial opening 29 in the element 5 through which a portion of the element 7 is received.

The element 7 is formed with a hollow cylindrical body portion 31 constituting a bearing portion and a substantially radially projecting flange 33 joined to the body portion 31 at one end thereof. The other end of the body portion 31 is chamfered as at 35 to facilitate crimping thereof as will be described. The flange 33 is provided with a conical truncated portion 37, and inwardly thereof a radially extending annular portion 39, which joins the body portion 31, abuts the outer end of the short cylindrical portion 23. The taper of the conical portion 37 is opposite to but identical with that of the portion 21 on the hub 9, and this portion 37 constitutes the other wall of the V-groove of the second step of the pulley. When the element 7 is fitted within the element 5 as shown, the body portion 31 extends through the opening 29 and cooperates with the hub 9 to define a lubricant reservoir indicated generally at 41 and which is divided by the ribs 25 into a plurality of separate chambers 41a. The reservoir 41 is closed at one end of the hub 9 by the conical portion 21 and the short cylindrical portion 23 which abuts the annular portion 39 and surrounds the body portion 31 of the element 7.

The element 5 may be die-cast and preferably is a zinc die-casting. The element 7 is formed of a suitable porous material, and in the preferred embodiment illustrated is formed of a porous sintered bearing material, such as sintered iron. The reservoir 41 is filled with wicking material, only portions being shown and indicated at 42 which feeds lubricant through the porous body portion 31 to the pulley shaft, not shown, on which the composite pulley is intended to be mounted. A particularly satisfactory wicking material which may be forced under pressure into the reservoir 41 is described and claimed in the copending application of Martin L. Abel, Serial No. 526,757, filed August 5, 1955, for Material Having Oil Retaining Properties, and another is that produced by the method described and claimed in the copending application of Martin L. Abel, Serial No. 604,567, filed August 16, 1956, for Method of Manufacturing Wicking Material. The wicking material as set forth in these copending applications is formed of small fibers of organic, inorganic, or synthetic material, or of a combination of these materials, and is capable of retaining up to ten times its weight of oil. Such material may be injected into the reservoir 41 under pressure without loss of lubricating quality.

The reservoir 41 is closed off at the end opposite the conical wall 21, and the wicking material 42 sealed therein, by an annular cover plate or washer 43 which has a central opening 45. The cover plate 43 bears against the end of the ribs 25 and its outer edge seats against an annular shoulder 27 formed in the hub 9. The cylindrical body portion 31 of the element 7 has a chamfered end 35 which extends through the opening 45 and is crimped outwardly over the inner edge of the plate 43 as indicated generally at 47 (FIGS. 2 and 5) to secure the plate 43 in place. When the plate 43 is thus secured, the elements 5, 7 and the plate 43 are prevented from moving relative to each other in an axial direction. To prevent relative rotational movement of the several parts, the element 7 is specially formed in accordance with a feature of the present invention during its process of manufacture with a pair of recesses 49 which extend longitudinally over the body portion 31 and which are diametrically spaced about the circumference thereof. Each recess 49 extends from the flange 33 to the chamfered end 35 of the body portion 31, and it should be noted that in the crimping operation described above, material of the end 35 over the width of each recess 49 is also crimped or flanged radially outwardly as at 47a to meet the opening 45 so as to seal the reservoir 41 at these areas. When the elements 5 and 7 are assembled with the plate 43 secured thereto as described, the short cylindrical portion 23 of the element 5 is dimpled inwardly as best shown in FIG. 4, at the recesses 49, to cause a cold flow of the material of the portion 23 so that portions thereof as at 51 distend and flow into the recesses 49 formed in the body portion 31. In this operation, the portion 23 becomes dimpled as shown in FIG. 4 and indicated at 53. Actually, in assembling the elements of the composite pulley, the several operations are preferably carried out simultaneously, i.e., the element 7 is fitted into the element 5, the wicking material 42 is injected under pressure into the reservoir 41, the cover 43 is placed in position, and the end 35 of the body portion 31 is crimped about the edge of the opening 45, and the portion 23 simultaneously dimpled to secure the element 5 against rotational movement relative to the element 7.

In operation, when the several parts of the composite pulley are assembled and secured as described and mounted on a pulley shaft which extends through the opening in the body portion 31 of the element 7, the composite pulley shown is self-lubricating in that lubricant retained by the wicking material 42 is fed through the body portion 31 to the pulley shaft as required. The element 7 is itself preferably impregnated under high pressure with lubricant, and a particularly useful condition of the element 7 is brought about by differentially impregnating it over its length with different lubricating materials. For example, it has been found desirable to impregnate the flange 33 which engages one side of a pulley belt with tung oil and to impregnate the body portion 31 which rubs against the pulley shaft with oxidation inhibited S.A.E. No. 30 oil.

It will be appreciated by those skilled in the art that numerous modifications and changes may be made without departing from the spirit of the present invention. For example, the elements 5 and 7 may if desired be held against relative rotation by cooperating keys and keyways, and the key or keys may be separately or integrally formed.

What is claimed:

1. A composite multi-step pulley adapted to be mounted on a supporting shaft and comprising a first element including a bearing portion adapted to rotatably support said pulley on said shaft, said first element also including a truncated conical surface forming a portion of one step of the pulley, a second one-piece element mounted on said first element and including a rim having another step of said pulley formed therein and a truncated conical surface forming a portion of said one step of said pulley, and means securing said elements against movement relative to each other.

2. A composite multi-step pulley as defined in claim 1 wherein said bearing portion of said first element is generally cylindrical and includes longitudinally extending keyway means on its outer surface, said second element includes a hub having said truncated conical surface formed thereon and including a short cylindrical section which engages the outer surface of a portion of said bearing portion of said first element and spaces the truncated conical surfaces of said one step of said pulley, said hub also having a plurality of radially inwardly extending ribs cooperating with said short cylindrical section to support said second element on said first element, said hub cooperating with said bearing portion of said first element to define a lubricant reservoir, and including a cover plate seated against the ends of said ribs, said means for securing said elements against movement relative to each other including a projection extending radially inwardly from said short cylindrical section into said keyway means to prevent relative rotation of said elements and an abutment surface on said first element engaging the end of said short cylindrical section of said hub and an end portion on said first element extending through said cover plate and engaging the outer surface thereof to hold said abutment surface in engagement with said hub to prevent relative axial movement of said elements in one direction and to hold said cover plate seated against the ends of said ribs to prevent relative axial movement of said elements in the opposite direction.

3. A composite multi-step pulley as defined in claim 1 wherein said first element is formed of a porous lubricant-permeable material.

4. A composite multi-step pulley adapted to be mounted on a supporting shaft and comprising a first element including a bearing portion adapted to rotatably support said pulley on said shaft, said first element also including a truncated conical surface forming a portion of one step of the pulley, a second one-piece element mounted on said first element and including a rim having another step of said pulley formed therein and a truncated conical surface forming a portion of said one step of said pulley, means securing said elements against movement relative to each other, a suitable bearing lubricant impregnating said bearing portion of said first element, and a suitable pulley belt lubricant impregnating a portion of said first element contiguous with said truncated conical surface thereof.

5. A composite multi-step pulley adapted to be mounted on a supporting shaft and comprising a first element including a bearing portion adapted to rotatably support said pulley on said shaft, said first element also including a truncated conical surface forming a portion of one step of the pulley, a second one-piece element mounted on said first element and including a rim having another step of said pulley formed therein and a truncated conical surface forming a portion of said one step of said pulley, and means securing said elements against movement relative to each other, said second element including a hub portion cooperating with said bearing portion to define a lubricant reservoir.

6. A composite multi-step pulley adapted to be mounted on a supporting shaft and comprising a first element including a bearing portion adapted to rotatably support said pulley on said shaft, said first element also including a truncated conical surface forming a portion of one step of the pulley, a second one-piece element mounted on said first element and including a rim having another step of said pulley formed therein and a truncated conical surface forming a portion of said one step of said pulley, means securing said elements against movement relative to each other, said second element including a hub portion cooperating with said bearing portion to define a lubricant reservoir, a lubricant impregnated wicking material disposed in said reservoir, and fixed means closing said reservoir.

7. A composite multi-step pulley adapted to be mounted on a supporting shaft and comprising a first element including a bearing portion adapted to rotatably support said pulley on said shaft, said first element also including a truncated conical surface forming a portion of one step of the pulley, a second one-piece element mounted on said first element and including a rim having another step of said pulley formed therein and a truncated conical surface forming a portion of said one step of said pulley, means securing said elements against movement relative to each other, said second element including a hub having a plurality of radially inwardly extending ribs the inner edges of which engage said bearing portion to support said second element on said first element, said ribs being closed at one end by said truncated conical portion for said one step of the pulley, and a washer closing the other end of said ribs retained against axial separation by the flanged end of the bearing portion.

8. A composite multi-step pulley, a circular element of dish shape having a central aperture and an extending sleeve, and a pulley having a laterally extending sleeve at the hub portion encompassing said first sleeve in spaced relation therewith, the dish-shaped section of the element being spaced from a sloping end on the second sleeve to form a pulley portion with the sleeve of the element forming a bearing.

9. A composite multi-step pulley, a circular element of dish shape having a central aperture and an extending sleeve, and a pulley having a laterally extending sleeve at the hub portion encompassing said first sleeve in spaced relation therewith, the dish-shaped section of the element being spaced from a sloping end on the second sleeve to form a pulley portion with the sleeve of the element forming a bearing, the space between said sleeves forming a reservoir for a lubricant carrying wicking material and the material of said element being porous to permit the lubricant to pass therethrough.

10. A composite multi-step pulley, a circular element of dish shape having a central aperture and an extending sleeve, a pulley having a laterally extending sleeve at the hub portion encompassing said first sleeve in spaced relation therewith, the dish-shaped section of the element being spaced from a sloping end on the second sleeve to form a pulley portion with the sleeve of the element forming a bearing, the space between said sleeves forming a reservoir for a lubricant carrying wicking material and the material of said element being porous to permit the lubricant to pass therethrough, and a closure for the space between said sleeves on the end opposite to that having the sloping end thereon.

11. A composite multi-step pulley comprising a first element formed of a lubricant-permeable sintered metal and including a sleeve bearing portion and a radially outwardly extending portion having a surface forming a part of one step of the pulley, and a die cast second element mounted on said first element in fixed relation thereto and including a surface forming another part of said one step of said pulley and another surface forming another step of said pulley.

References Cited in the file of this patent

UNITED STATES PATENTS

| | | |
|---|---|---|
| 828,242 | Phillips | Aug. 7, 1906 |
| 1,740,087 | Hall | Dec. 17, 1929 |
| 2,571,393 | Tann | Oct. 16, 1951 |
| 2,571,868 | Haller | Oct. 16, 1951 |
| 2,738,681 | Schultz | Mar. 20, 1956 |
| 2,755,675 | Abel | July 24, 1956 |
| 2,787,165 | Schultz | Apr. 2, 1957 |

FOREIGN PATENTS

| | | |
|---|---|---|
| 78,401 | Norway | Apr. 9, 1951 |